United States Patent
Kanie et al.

(10) Patent No.: US 9,676,425 B2
(45) Date of Patent: Jun. 13, 2017

(54) EXPANDABLE HOLE PLUG ASSEMBLY

(71) Applicant: ILLINOIS TOOL WORKS INC., Glenview, IL (US)

(72) Inventors: Hideki Kanie, Aichi (JP); Mark T. Leuthe, Chippewa Falls, WI (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 14/906,074

(22) PCT Filed: May 6, 2014

(86) PCT No.: PCT/US2014/036953
§ 371 (c)(1),
(2) Date: Jan. 19, 2016

(87) PCT Pub. No.: WO2015/012937
PCT Pub. Date: Jan. 29, 2015

(65) Prior Publication Data
US 2016/0176446 A1    Jun. 23, 2016

Related U.S. Application Data

(60) Provisional application No. 61/858,294, filed on Jul. 25, 2013.

(51) Int. Cl.
*B60J 9/00* (2006.01)
*B62D 25/24* (2006.01)

(52) U.S. Cl.
CPC .................................. *B62D 25/24* (2013.01)

(58) Field of Classification Search
CPC ..................................................... B62D 25/02
See application file for complete search history.

(56) References Cited

U.S. PATENT DOCUMENTS

| | | | |
|---|---|---|---|
| 4,363,420 A | 12/1982 | Andrews | |
| 5,829,482 A | 11/1998 | Takabatake | |
| 5,852,854 A | 12/1998 | Pierrot et al. | |
| 8,162,166 B2* | 4/2012 | Nakazato | B62D 25/24 220/359.4 |

FOREIGN PATENT DOCUMENTS

| | | |
|---|---|---|
| DE | 10303366 A1 | 8/2004 |
| WO | 2012062448 A1 | 5/2012 |

OTHER PUBLICATIONS

ISR and WO for PCT/US2014/036953 mailed Sep. 1, 2014.

* cited by examiner

*Primary Examiner* — Lori L Lyjak
(74) *Attorney, Agent, or Firm* — Joseph Butscher; The Small Patent Law Group, LLC

(57) ABSTRACT

A hole plug assembly is configured to be secured within a hole of a panel, and may include a main body having at least a portion that is configured to be secured in the hole of the panel, and an expandable layer connected to the main body. The expandable layer is configured to expand into the hole to form a fluid-tight barrier.

20 Claims, 4 Drawing Sheets

EXPANDABLE HOLE PLUG ASSEMBLY

RELATED APPLICATIONS

This application relates to and claims priority benefits from U.S. Provisional Patent Application No. 61/858,294, filed Jul. 25, 2013, which is hereby incorporated by reference in its entirety.

FIELD OF EMBODIMENTS OF THE DISCLOSURE

Embodiments of the present disclosure generally relate to devices configured to plug holes within components, and, more particularly, to expandable hole plug assemblies.

BACKGROUND

Various devices and components include panels and the like having holes formed therein. During an assembly process, the holes may receive and retain fasteners, or allow tubing, wiring, or the like to pass therethrough. In some instances, however, a hole may not be utilized. Similarly, the hole may be reserved for a future application, for example. Hole plugs are used to securely cover and close holes formed within panels of a device. A typical hole plug is formed of a resilient material, such as rubber, that allows the hole plug to flex, while at the same time providing a fluid-tight barrier.

In various applications, particularly automotive applications, a component, such as a panel or frame, may be electrocoated ("e-coated"). During an e-coat process, the component may be immersed in an e-coat pool or bath, which may include, for example, 80-90% deionized water and 10-20% paint material. The deionized water provides a carrier for the paint material, which may include solid paint pieces having resins, pigments, solvents, and/or the like. The resin typically protects against corrosion, while the pigments provide color (and may also protect against corrosion). The solvents are used to ensure smooth application of the material onto the component.

In general, the component may includes drain holes or the like that are configured to allow the e-coat liquid to drain therethrough after the component has been removed from the e-coat pool or bath. After the component has been positioned within a panel or other such component, the drain channels are then plugged or covered with hole plugs and/or stickers in order to prevent moisture and sound energy, for example, from passing therethrough.

Notably, it may often be difficult to gain access to a component and/or drain channel formed therethrough after it has been secured in position. For example, after a component has been secured to an outer panel of an automobile, the outer panel and/or another panel, such as an interior panel, may prevent an individual from inserting a hole plug or sticker into or onto one or more drain channels formed through the component.

As such, a separate and distinct foam block or seal may be positioned between the panels. The foam block or seal is typically distally located from the hole plug and/or sticker. That is, the foam block or seal may be positioned upstream (or downstream) from the hole plug in a potential fluid path. It has been found, however, that separate and distinct foam blocks and seals are costly, bulky, and may be difficult to position at a desired location.

Accordingly, known methods of plugging components may prove time-consuming and expensive. Moreover, in order to protect against moisture infiltration and undesirable sound energy, most, if not all, of the holes formed through a component are each plugged with a hole plug, which increases manufacturing time and cost.

SUMMARY OF EMBODIMENTS OF THE DISCLOSURE

Certain embodiments of the present disclosure provide a hole plug assembly that is configured to be secured within a hole of a panel. The hole plug assembly may include a main body having at least a portion that is configured to be secured in the hole of the panel, and an expandable layer connected to the main body. The expandable layer is configured to expand into the hole to form a fluid-tight barrier.

The expandable layer may be configured to be in an unexpanded state at one or both of a first temperature and first pressure. The expandable layer may be configured to expand at a second temperature and/or second pressure that differ from the first temperature and the first pressure, respectively.

In at least one embodiment, the main body may include a circumferential rim connected to a ledge. The expandable layer may be positioned between the circumferential rim and the ledge.

An opened-ended passage may be defined through at least a portion of the expandable layer in an unexpanded state. A liquid coating may coat the main body and at least a portion of the expandable layer. An excess portion of the liquid coating drains through the open-ended passage in the unexpanded state.

In at least one embodiment, the expandable layer may include a single ring of expandable material. In at least one other embodiment, the expandable layer may include multiple rings of expandable material.

The main body may include at least one hole-securing member configured to snapably secure the hole plug assembly into the hole.

Certain embodiments of the present disclosure provide a hole-plugging system. The system may include a component having a hole formed therethrough, and an expandable hole plug assembly configured to be secured within the hole. The expandable hole plug assembly may include a main body having at least a portion that is secured in the hole of the panel, and an expandable layer connected to the main body. The expandable layer is configured to expand into the hole to form a fluid-tight barrier.

Figure 1A:
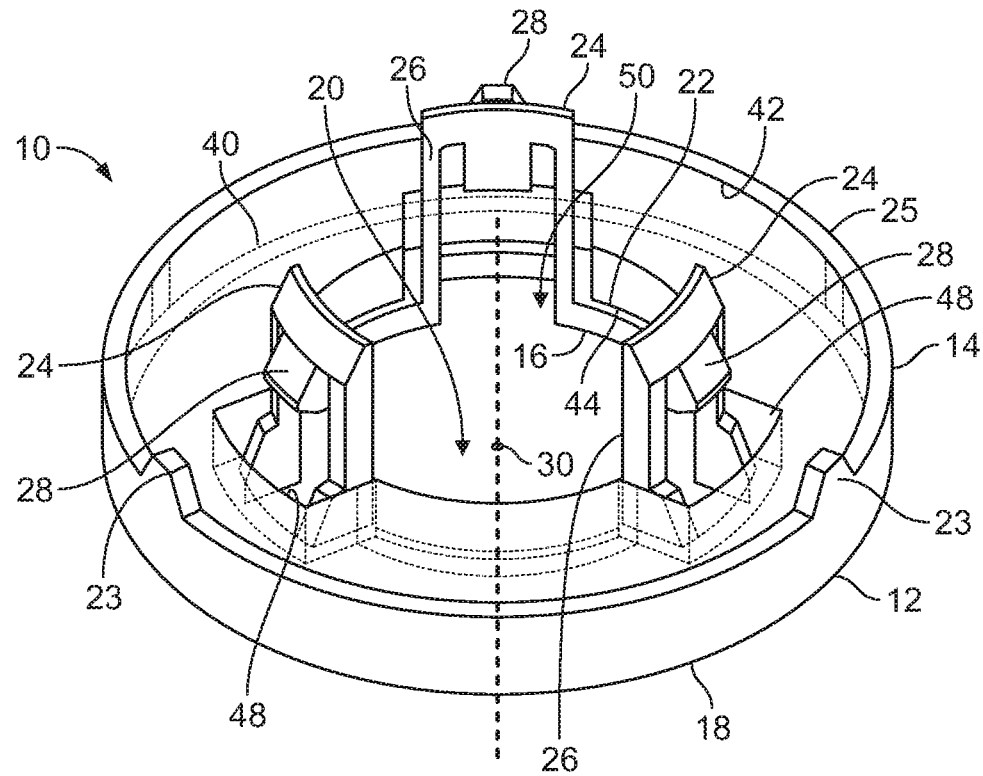
FIG. 1A illustrates a perspective bottom view of a hole plug assembly, according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

FIG. 1A illustrates a perspective bottom view of a hole plug assembly 10, according to an embodiment of the present disclosure. The hole plug assembly 10 includes a main body 12, which may be formed of plastic, rubber, metal, or the like. The main body 12 may include an outer circumferential upstanding rim 14 integrally connected to a perpendicular ledge 16 that extends radially inward from an upper edge 18 of the rim 14. A central passage 20 is defined through the main body 12 with respect to an interior edge 22 of the ledge 16. As shown, the main body 12 is generally shaped having a circular axial cross-section. However, the main body 12 may be formed as various other shapes and sizes, such as oval, elliptical, rectangular, triangular, or the like.

One or more offsetting protuberances 23 may downwardly extend from a lower edge 25 of the rim 14. The protuberances 23 may be configured to offset the rim 14 above, below, or otherwise away from a component, such as a panel, for example. The main body 12 may include more or less protuberances 23 than shown. Alternatively, the main body 12 may not include any of the protuberances 23.

Hole-securing members 24 extend downwardly from the interior edge 22 about the central passage 20. The hole-securing members 24 may be prongs, baths, clips, latches, or the like that are configured to securely connect the main body 12 into a hole formed through a component. For example, each hole-securing member 24 may include one or more flexible extension beams 26 that connect to distal ramped tips 28. In the at-rest position, as shown in FIG. 1, the flexible extension beams 26 may generally be parallel with the rim 14. The flexible extension beams 26 are configured to flex inwardly toward a central axis 30 as the hole plug assembly 10 is urged into a hole. As the ramped tips 28 are moved past internal edges that define the hole, the extension beams 26 snap back to their at-rest positions, and the ramped tips 28 securely latch onto the surfaces around the hole, thereby securing the hole plug assembly 10 in position. Accordingly, the hole-securing members 24 may be configured to snapably secure the hole plug assembly 10 into a hole. Alternatively, the hole-securing members 24 may be or otherwise include various other structures configured to snapably, latchably, or otherwise removably secure the hole plug assembly 10 into a hole. Further, while three hole-securing members 24 are shown, more or less hole-securing members 24 than shown may be used.

The hole plug assembly 10 also includes an internal expandable layer 40 disposed between an interior surface 42 of the rim 14 and a lower surface 44 of the ledge 16. In the unexpanded state, the internal expandable layer 40 may not extend past the interior edge 22 of the ledge 16 into the central passage 20. As such, an open path is formed through the central passage 20 when the internal expandable layer 40 is in an unexpanded state. Alternatively, the expandable layer 40 may radially extend past the interior edge 22 toward the central axis, so long as an open channel is formed through the expandable layer 40 in the unexpanded state.

As shown, the expandable layer 40 may radially extend toward the central axis 30 from the interior surface 42 of the rim 14 up and to the interior edge 22. Divots 48 may be formed in the expandable layer 40 proximate to the hole-securing members 24. Alternatively, the expandable layer 40 may not include the divots 48, but may instead extend into spaces 50 formed between the extension beams 26 of the hole-securing members 24.

The expandable layer 40 may be a ring of material that conforms to the size and shape of the main body 12. The expandable layer 40 may extend from the lower surface 44 of the ledge 16 to a plane of the lower edge 25 of the rim 14. The height of the expandable layer 40, from the lower edge 25 of the rim 14 to lower surface 44 of the ledge 16, may be uniform throughout. Optionally, the height of the expandable layer 40 may not be uniform throughout. For example, the height of the expandable layer 40 may be greater proximate to the rim 14 than proximate to the central passage 20, or vice versa.

The expandable layer 40 may be a single layer of expandable material. Alternatively, the expandable layer 40 may include multiple levels of separate and distinct expandable material. For example, a first ring of expandable material may be configured to expand at a first temperature, while a second ring of expandable material that overlays the first ring may be configured to expand at a second temperature that differs from the first temperature. Accordingly, the expandable layer 40 may be or include one or more expandable layers of expandable material.

The expandable layer 40 may be formed of an expandable material that expands when heat is applied thereto, and/or when the expandable material is subjected to a change in pressure, such as a decrease or increase in pressure. For example, the expandable material may be or include polyurethane foam, urethane foam, or two part closed cell foams that provide a water proof barrier. As another example, the expandable material may formed of an expandable resin, or the like.

Figure 1B:
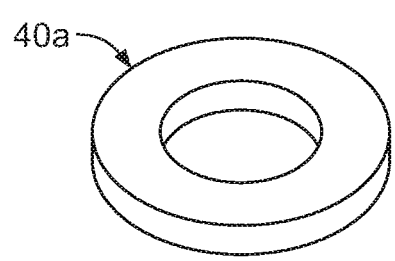
FIG. 1B illustrates a perspective top view of an expandable layer, according to an embodiment of the present disclosure.

FIG. 1B illustrates a perspective top view of an expandable layer 40a, according to an embodiment of the present disclosure. The expandable layer 40a may be used as the expandable layer 40 shown in FIG. 1. The expandable layer 40a includes a single layer or ring 40a of expandable material, which is configured to expand at a particular temperature and/or pressure.

Figure 1C:
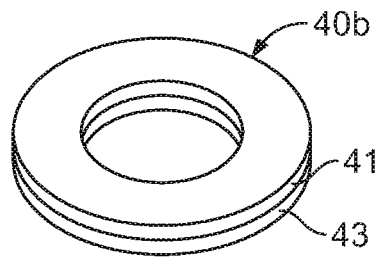
FIG. 1C illustrates a perspective top view of an expandable layer, according to an embodiment of the present disclosure.

FIG. 1C illustrates a perspective top view of an expandable layer 40b, according to an embodiment of the present disclosure. The expandable layer 40b may be used as the expandable layer 40 shown in FIG. 1. The expandable layer

40*b* includes a first layer or ring 41 of expandable material that overlays a second layer or ring 43 of expandable material. The first ring 41 and the second layer ring 43 may be formed of different expandable materials, each of which is configured to expand at a particular temperature and/or pressure. The first ring 41 may be secured to the second ring 43 through an adhesive, for example. Alternatively, the first ring 41 may simply be positioned over the second ring 43 without a fastening or adhesive agent. The expandable layer 40*b* may include more layers or rings than those shown.

Figure 1D:
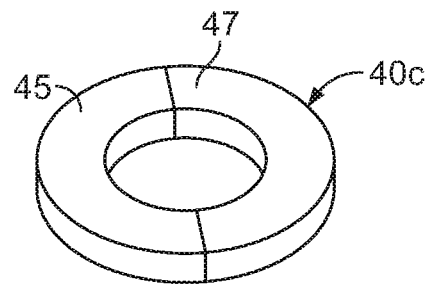
FIG. 1D illustrates a perspective top view of an expandable layer according to an embodiment of the present disclosure.

FIG. 1D illustrates a perspective top view of an expandable layer 40*c*, according to an embodiment of the present disclosure. The expandable layer 40*c* may be used as the expandable layer 40 shown in FIG. 1. The expandable layer 40*c* includes a first C-shaped half 45 of expandable material that abuts into a mirror image second C-shaped half 47 of expandable material. The first half 45 and the second half ring 47 may be formed of different expandable materials, each of which is configured to expand at a particular temperature and/or pressure. The first half 45 may be secured to the second half 47 through an adhesive, for example. Alternatively, the first half 45 may simply abut into the second half 47 without a fastening or adhesive agent. The expandable layer 40*c* may be subdivided into more portions than shown, such as thirds, quarters, fifths, and the like.

Figure 2:
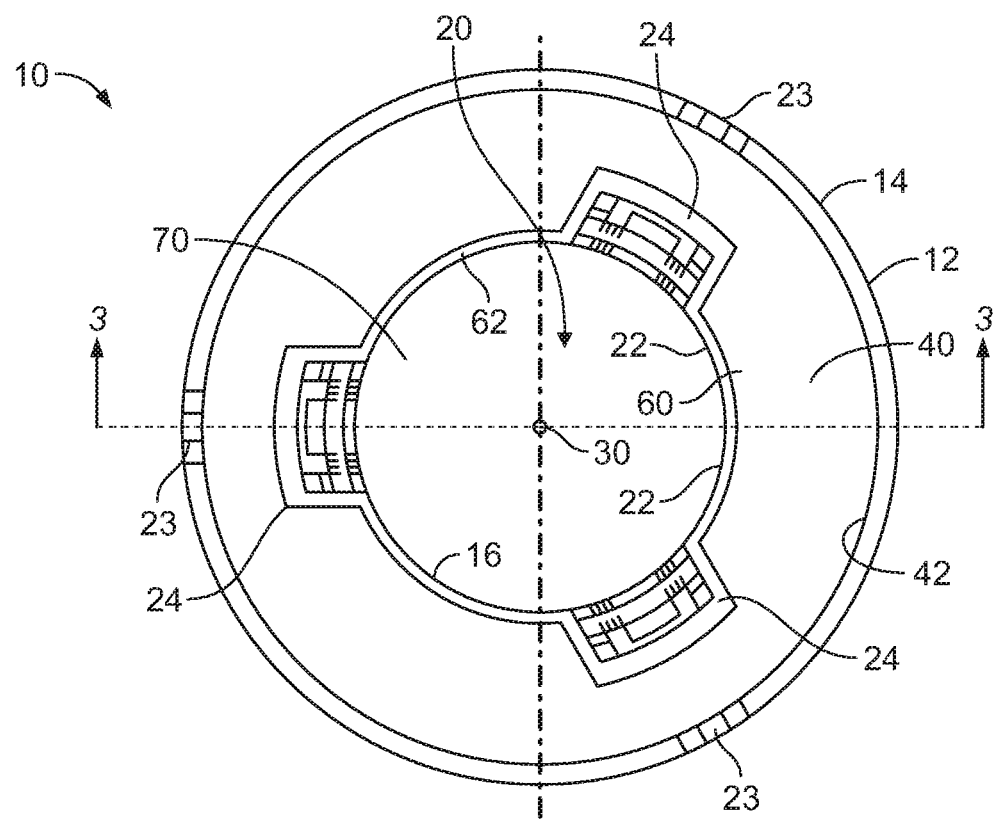
FIG. 2 illustrates a bottom view of a hole plug assembly, according to an embodiment of the present disclosure.

FIG. 2 illustrates a bottom view of the hole plug assembly 10, according to an embodiment of the present disclosure. As shown, the internal expandable layer 40 may extend from the interior surface 42 of the rim 14 to the interior edge 22 of the ledge 16. In the unexpanded state, the inner edge 60 of the expandable layer 40 may not extend past an axial envelope 62 of the interior edge 22 of the ledge 16 so that the central passage 20 remains clear and open. As noted above, however, the inner edge 60 may alternatively extend past the axial envelope 62, so long as the inner edge 60 defines a central opening for liquid, such as e-coat liquid, to pass therethrough in the unexpanded state. In general, an unexpanded passage 70 is defined between the inner edge 60 of the expandable layer 40 in the unexpanded state.

Figure 3:
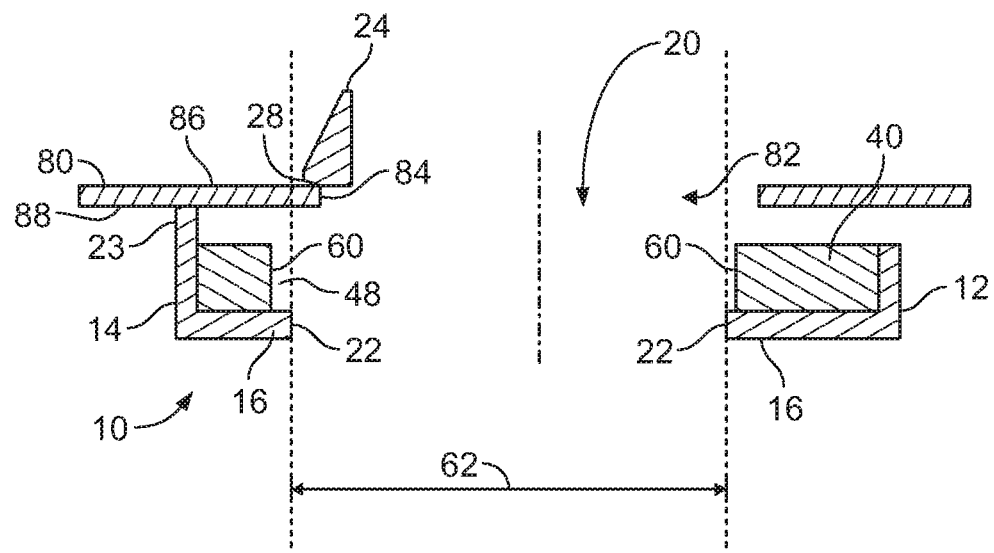
FIG. 3 illustrates a transverse cross-sectional of a hole plug assembly through line 3-3 of FIG. 2, according to an embodiment of the present disclosure.

FIG. 3 illustrates a transverse cross-sectional of the hole plug assembly 10 through line 3-3 of FIG. 2, according to an embodiment of the present disclosure. The hole plug assembly 10 is shown secured to a component, such as a panel 80. The hole plug assembly 10 and the panel 80 may combine to form a system. Referring to FIGS. 1-3, the hole-securing members 24 secure the hole plug assembly 10 into a hole 82 defined by an interior edge 84 of the panel 80. The ramped tips 28 of the hole-securing members 24 abut into a lower surface 86 of the panel 80, while the protuberances 23 abut into an upper surface 88 of the panel 80, thereby securely clamping the hole plug assembly 10 into the hole 82. As shown, in the unexpanded state, the expandable layer 40 may not extend past the axial envelope 62 of the interior edge 22 of the ledge 16. Accordingly, the central passage 20 of the main body 12 is free and open so that liquid may pass therethrough, while the expandable layer 40 is in the unexpanded state.

Figure 4:
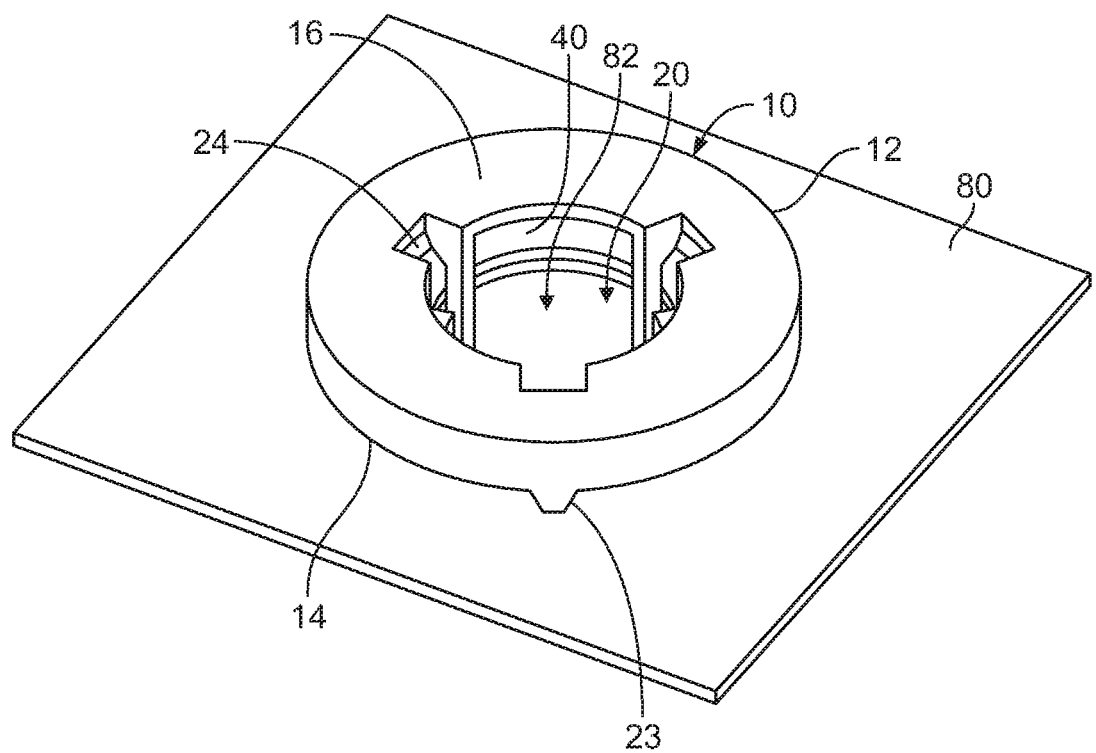
FIG. 4 illustrates a perspective top view of a hole plug assembly secured into a hole of a panel, according to an embodiment of the present disclosure.

FIG. 4 illustrates a perspective top view of the hole plug assembly 10 secured into the hole 82 of the panel 80, according to an embodiment of the present disclosure. The hole plug assembly 10 and the panel 80 may both be coated with, immersed in, sprayed with, etc. a liquid coating, such as an e-coat liquid. Excess liquid may then drain off the hole plug assembly 10 and the panel 80 through the open central passage 20. After the hole plug assembly 10 and the panel 80 are coated and drained of excess liquid, heat may be applied to the expandable layer 40. As heat is applied, the expandable layer 40 expands to fill in and close the central passage 20, thereby providing a fluid-tight barrier. Optionally, instead of heat, the expandable layer 40 may be configured to expand during a change in pressure.

Figure 5:
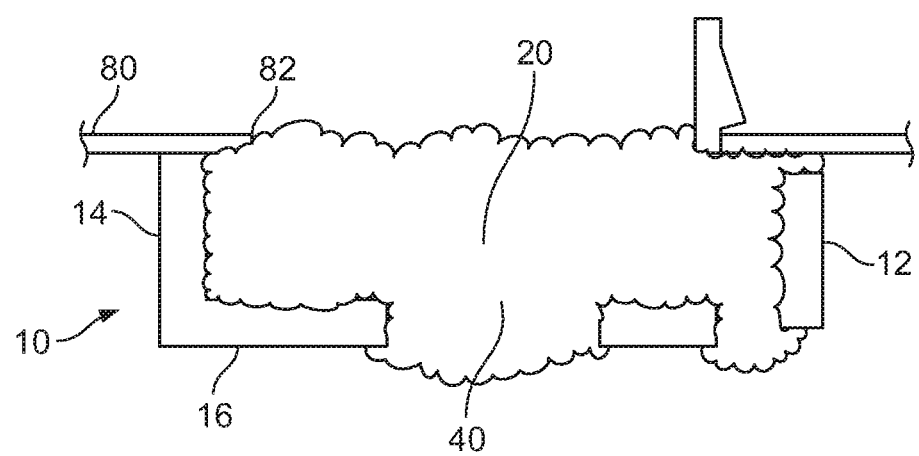
FIG. 5 illustrates a transverse cross-sectional view of hole plug assembly in an expanded state, according to an embodiment of the present disclosure.

FIG. 5 illustrates a transverse cross-sectional view of the hole plug assembly 10 in an expanded state, according to an embodiment of the present disclosure. As shown, the expandable layer 40 has expanded to completely fill the central passage 20 and the hole 82 of the panel 80. The expandable layer 40 may be sized and configured to fill any and all internal openings within the main body 12 as heat is applied. For example, at room temperature, the expandable layer 40 may not fill the central passage 20. However, when the hole plug assembly 10 is cured within an oven to a temperature exceeding 60° C., for example, the expandable layer 40 expands and fills the central passage 20, as shown in FIG. 5, to form a fluid-tight barrier that prevents liquid, such as water, from passing therethrough, and dampens vibratory energy, such as sound.

Figure 6:
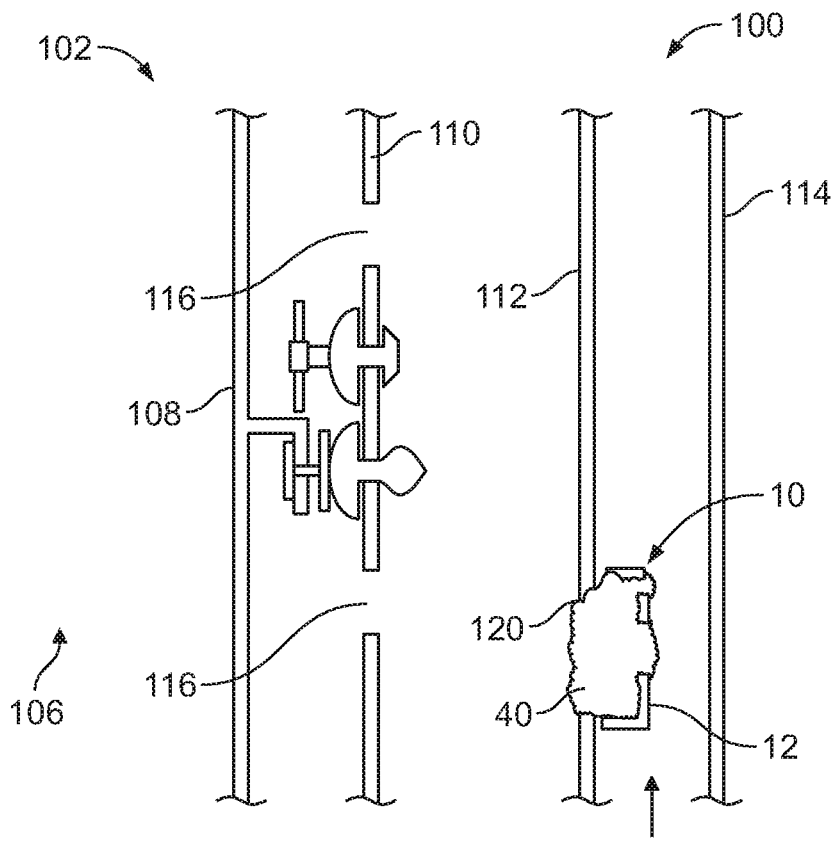
FIG. 6 illustrates an interior cross-sectional view of an outer frame of a vehicle, according to an embodiment of the present disclosure.

FIG. 6 illustrates an interior cross-sectional view of an outer frame 100 of a vehicle 102, according to an embodiment of the present disclosure. The outer frame 100 is outside of an interior vehicle cabin 106 and may include an interior trim panel 108 inboard from an inner panel 110, which is, in turn, inboard from an intermediate panel 112, which is, in turn, inboard from an outer panel 114. The inner panel 110 may include a plurality of holes 116 formed therethrough, which may otherwise be difficult to engage. Instead of positioning separate and distinct hole plugs into each and every hole 116, a single expandable hole plug assembly 10 may be inserted into a hole 120 formed through the intermediate panel 112, which may be coated with a liquid material, such as e-coat liquid, along with the expandable hole plug assembly 10. Heat may be applied in order to expand the expandable material 40 to close the hole 120 and provide a liquid-tight, sound-dampening barrier therein. As such, the expandable hole plug assembly 10 may be used to prevent moisture and outside sound energy from passing into the interior cabin 106.

Figure 7:
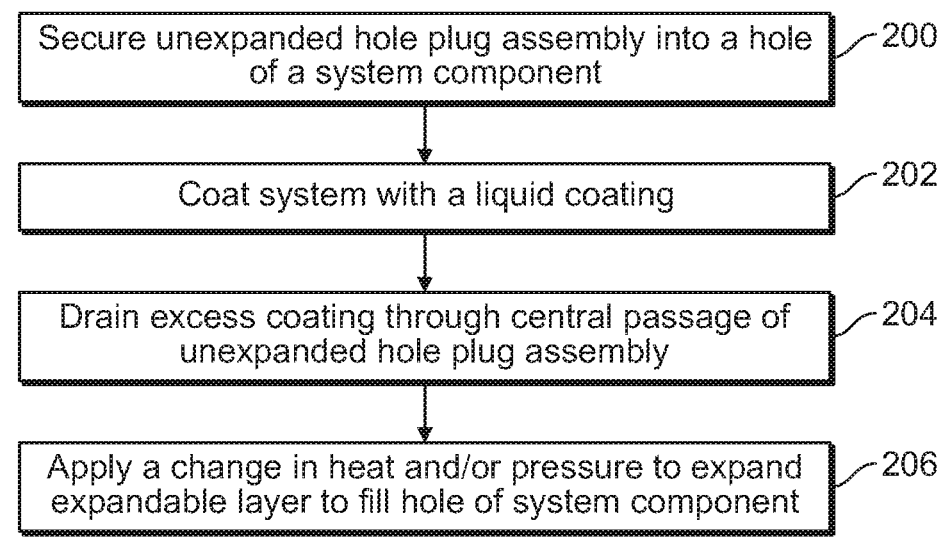
FIG. 7 illustrates a flow chart of a method of securely plugging a hole of a component, according to an embodiment of the present disclosure.

FIG. 7 illustrates a flow chart of a method of securely plugging a hole of a component, according to an embodiment of the present disclosure. At 200, a hole plug assembly, such as the expandable hole plug assembly 10, is secured into a hole of a system component, such as a panel. Next, at 202, the system, including the panel and the hole plug assembly, is coated with a liquid coating, such as e-coating liquid. For example, the system may be immersed in a bath of e-coating liquid. After liquid coating, the system may be removed from the liquid bath and, at 204, excess liquid drains through a passage, such as the central passage 20, of the unexpanded hole plug assembly. During 200-204, the system may be subject to a first temperature and pressure, such as room temperature and 1 atmosphere of pressure. After the excess liquid coating has been drained, at 206, the system is subjected to a change in heat and/or pressure so that the expandable layer of the hole plug assembly expands to fill the hole of the system component, thereby providing a fluid-tight barrier. Optionally, the expandable layer may expand as the liquid coating dries thereon and/or therein.

Accordingly, embodiments of the present disclosure provide an expandable hole plug assembly that may be used to efficiently plug a hole of a component. Embodiments of the present disclosure provide hole plug assemblies that reduce the time and expense of plugging holes within a system.

While various spatial and directional terms, such as top, bottom, lower, mid, lateral, horizontal, vertical, front and the like may be used to describe embodiments of the present disclosure, it is understood that such terms may merely be used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. 112(f), unless and until such claim limitations expressly use the phrase "means for" followed by a statement of function void of further structure.

Various features of the disclosure are set forth in the following claims.

The invention claimed is:

1. A hole plug assembly configured to be secured within a hole of a panel, the hole plug assembly comprising:
   a main body having at least a portion that is configured to be secured in the hole of the panel, wherein a central passage is formed through the main body; and
   an expandable layer connected to the main body, wherein the expandable layer is configured to expand into the hole to form a fluid-tight barrier, wherein the central passage is open when the expandable layer is in an unexpanded state, and wherein the expandable layer fills and closes the central passage in an expanded state.

2. The hole plug assembly of claim 1, wherein the expandable layer is configured to be in the unexpanded state at one or both of a first temperature and first pressure, and wherein the expandable layer is configured to expand at one or both of a second temperature and second pressure that differ from the first temperature and the first pressure, respectively.

3. The hole plug assembly of claim 1, wherein the main body comprises a circumferential rim connected to a ledge, wherein the expandable layer is positioned between the circumferential rim and the ledge.

4. The hole plug assembly of claim 1, wherein an opened-ended passage is defined through at least a portion of the expandable layer in the unexpanded state.

5. The hole plug assembly of claim 4, further comprising a liquid coating that coats the main body and at least a portion of the expandable layer, wherein an excess portion of the liquid coating drains through the open-ended passage in the unexpanded state.

6. The hole plug assembly of claim 1, wherein the expandable layer comprises a single ring of expandable material.

7. The hole plug assembly of claim 1, wherein the expandable layer comprises multiple rings of expandable material.

8. The hole plug assembly of claim 1, wherein the main body comprises at least one hole-securing member configured to snapably secure the hole plug assembly into the hole.

9. A hole-plugging system, the system comprising:
   a component including a hole formed therethrough; and
   an expandable hole plug assembly configured to be secured within the hole, the expandable hole plug assembly comprising:
      a main body having at least a portion that is secured in the hole of the panel wherein a central passage is formed through the main body; and
      an expandable layer connected to the main body, wherein the expandable layer is configured to expand into the hole to form a fluid-tight barrier, wherein the central passage is open when the expandable layer is in an unexpanded state, and wherein the expandable layer fills and closes the central passage in an expanded state.

10. The system of claim 9, wherein the expandable layer is configured to be in the unexpanded state at one or both of a first temperature and first pressure, and wherein the expandable layer is configured to expand at one or both of a second temperature and second pressure that differ from the first temperature and the first pressure, respectively.

11. The system of claim 9, wherein the main body comprises a circumferential rim connected to a ledge, wherein the expandable layer is positioned between the circumferential rim and the ledge.

12. The system of claim 9, wherein an opened-ended passage is defined through at least a portion of the expandable layer in the unexpanded state.

13. The system of claim 12, further comprising a liquid coating that coats the at least a portion of the expandable hole plug assembly and the component, wherein an excess portion of the liquid coating drains through the open-ended passage before the system is cured to expand the expandable layer.

14. The system of claim 9, wherein the expandable layer comprises a single ring of expandable material.

15. The system of claim 9, wherein the expandable layer comprises multiple rings of expandable material.

16. The system of claim 9, wherein the main body comprises at least one hole-securing member configured to snapably secure the hole plug assembly into the hole.

17. A hole plug assembly configured to be secured within a hole of a panel, the hole plug assembly comprising:
   a main body having at least a portion that is configured to be secured in the hole of the panel, wherein the main body comprises a circumferential rim connected to a ledge, wherein a central passage is defined through the main body with respect to an interior edge of the ledge; and
   an expandable layer positioned between the circumferential rim and the ledge, wherein the expandable layer is configured to expand into the hole to form a fluid-tight barrier, wherein the expandable layer is configured to be in an unexpanded state at one or both of a first temperature and first pressure, wherein the expandable layer is configured to expand at one or both of a second temperature and second pressure that differ from the first temperature and the first pressure, respectively, wherein an opened-ended passage is defined through at least a portion of the expandable layer in the unexpanded state, wherein the central passage of the main body is open when the expandable layer is in the unexpanded state, and wherein the expandable layer fills and closes the central passage in an expanded state.

18. The hole plug assembly of claim 17, further comprising a liquid coating that coats the main body and at least a portion of the expandable layer, wherein an excess portion of the liquid coating drains through the open-ended passage in the unexpanded state.

19. The hole plug assembly of claim 17, wherein the expandable layer comprises a single ring of expandable material.

20. The hole plug assembly of claim 17, wherein the expandable layer comprises multiple rings of expandable material.

\* \* \* \* \*